United States Patent
Andorko et al.

(10) Patent No.: US 11,778,315 B2
(45) Date of Patent: Oct. 3, 2023

(54) VEHICLE OCCUPANT MONITORING SYSTEM INCLUDING AN IMAGE ACQUISITION DEVICE WITH A ROLLING SHUTTER IMAGE SENSOR

(71) Applicant: FotoNation Limited, Galway (IE)

(72) Inventors: Istvan Andorko, Galway (IE); Petronel Bigioi, Galway (IE); Piotr Stec, Galway (IE)

(73) Assignee: FotoNation Limited

(*) Notice: Subject to any disclaimer, the term of this patent is extended or adjusted under 35 U.S.C. 154(b) by 43 days.

(21) Appl. No.: 17/547,090

(22) Filed: Dec. 9, 2021

(65) Prior Publication Data
US 2023/0188838 A1   Jun. 15, 2023

(51) Int. Cl.
| | |
|---|---|
| *H04N 23/667* | (2023.01) |
| *H04N 5/33* | (2023.01) |
| *G06V 20/59* | (2022.01) |
| *H04N 23/73* | (2023.01) |
| *H04N 23/74* | (2023.01) |
| *H04N 23/76* | (2023.01) |

(52) U.S. Cl.
CPC ......... *H04N 23/667* (2023.01); *G06V 20/593* (2022.01); *H04N 5/33* (2013.01); *H04N 23/73* (2023.01); *H04N 23/74* (2023.01); *H04N 23/76* (2023.01)

(58) Field of Classification Search
CPC ........ H04N 23/667; H04N 5/33; H04N 23/73; H04N 23/74; H04N 23/76; G06V 20/593
See application file for complete search history.

(56) References Cited

U.S. PATENT DOCUMENTS

| | | | |
|---|---|---|---|
| 2010/0289885 A1 | 11/2010 | Lu et al. | |
| 2011/0298944 A1 | 12/2011 | Kuo et al. | |
| 2014/0125794 A1* | 5/2014 | Kanou | G06V 20/58 348/113 |
| 2016/0127659 A1* | 5/2016 | Kawasaki | H04N 23/667 348/164 |

(Continued)

FOREIGN PATENT DOCUMENTS

| | | |
|---|---|---|
| DE | 102020214713 A1 * | 5/2022 |
| WO | WO-2021230933 A2 * | 11/2021 |

OTHER PUBLICATIONS

Anonymous: "The Exposure Triangle—A Beginner's Guide", Nov. 23, 2021 (Nov. 23, 2021), XP093015083, Retrieved from the Internet: URL:https://web.archive.org/web/20211123102750/https://photographylife.com/what-is-exposure-triangle [retrieved on Jan. 18, 2023]. 8 pgs.

(Continued)

*Primary Examiner* — Michael Lee
(74) *Attorney, Agent, or Firm* — Lerner David LLP

(57) ABSTRACT

A vehicle occupant monitoring system, OMS, comprises an image acquisition device with a rolling shutter image sensor comprising an array of sub-pixels which are respectively selectively sensitive to: red and infra-red; blue and infra-red; and green and infra-red light. The device is configured to selectively operate in either: a colour mode where a multi-plane image frame corresponding to the full image sensor is provided, each plane derived from red, green or blue sensitive sub-pixels respectively; or a monochrome mode, where sensor information from sub-pixels is aggregated to provide a single image plane.

12 Claims, 6 Drawing Sheets

(56) References Cited

U.S. PATENT DOCUMENTS

| | | |
|---|---|---|
| 2016/0248971 A1 | 8/2016 | Tall et al. |
| 2020/0107419 A1* | 4/2020 | Lee .................. H05B 47/11 |
| 2020/0184669 A1 | 6/2020 | Stent |
| 2021/0072831 A1* | 3/2021 | Edwards ............ G06F 3/013 |
| 2021/0295069 A1* | 9/2021 | Toth .................. B60R 11/04 |
| 2021/0329157 A1* | 10/2021 | Lu .................... H04N 23/11 |
| 2022/0083786 A1* | 3/2022 | Herbst ............ H04N 23/611 |
| 2022/0198604 A1* | 6/2022 | Dabral .............. H04N 23/12 |

OTHER PUBLICATIONS

Partial International Search Report and Associated Communication issued in PCT/EP2022/078506 dated Jan. 27, 2023. 19 pgs.

International Search Report including Written Opinion for Application No. PCT/EP2022/078506 dated Apr. 24, 2023, pp. 1-25.

Mitchell, H. B., "Image Fusion" Mar. 2010, XP093039125, ISBN: 978-3-642-11216-4, Retrieved from the Internet: URL:https://link.springer.com/book/10.1007/978-3-642-11216-4>, the last section "15.2.1 Vignetting Correction", p. 188.

* cited by examiner

VEHICLE OCCUPANT MONITORING SYSTEM INCLUDING AN IMAGE ACQUISITION DEVICE WITH A ROLLING SHUTTER IMAGE SENSOR

FIELD

The present invention relates to a vehicle occupant monitoring system (OMS) including an image acquisition device with a rolling shutter image sensor.

BACKGROUND

Referring now to FIG. 1, there is shown an exposure cycle for acquiring an image frame using a conventional global shutter image sensor. The cycle comprises a number of phases, a first 10-A in which all rows of the image sensor are simultaneously reset in response to a trigger signal at the start of a frame. In the next phase 10-B, all rows of the image sensor are simultaneously exposed for an exposure time T and with a sensor gain G. At the end of the exposure time T, charge is transferred from each sensor photodiode to a respective capacitor, phase 10-C. During the exposure phase, if necessary, a scene being imaged can be illuminated with a light source, for example, an LED flash, for a time, $T_f$, and intensity required to illuminate the scene sufficiently to allow a suitably exposed image.

Thereafter, charge is read from multiple groups 1 ... n of rows of the image, one after another. The time from triggering the reset of the rows to reading the values from the last group of rows 10-Dn determines the frame rate.

In comparison, for a rolling shutter sensor, the phases 10A to 10D are performed for each group of rows 1 ... n in a staggered fashion.

In a rolling shutter sensor, for the same pixel pitch, the fill factor of sensor pixels is better with more sensor area exposed to light. For the same pixel pitch, rolling shutter sensors have better dynamic range due to larger well capacity. Rolling shutter sensors are also easier and cheaper to manufacture.

In vehicle driver monitoring systems (DMS), there is a requirement for a full HD (1920×1080) camera sensor with a lens assembly having a 60-70 degree field of view. Such an imaging system can produce an image including a facial region of a driver at a distance of 1 meter extending to approximately 160×160 pixels. For occupant monitoring systems (OMS) where both front seat occupants as well as possibly rear seat occupants are to be monitored, a wide field of view lens assembly with a horizontal field of view of 120 degrees or more may be required. In either case, the image sensor would typically be required to be sensitive to infra-red (IR) wavelengths, but also be sensitive to visible wavelengths, so that they operate in both daytime and night time conditions.

However, as is well appreciated, because of the staggered exposure times of rows within the sensor, rolling shutter sensors are prone to distortion problems when either the sensor or the scene/object is moving. As such, they have typically not been employed in monitoring applications where it is important to detect and classify subject movement.

Also, for vehicle occupant monitoring systems, the vehicle cabin would ideally be illuminated with an infra-red (IR) light source operating in a pulsed mode—this prevents heat building up within the camera housing over long periods of monitoring. (Note that when such a camera operates in daylight, colour mode, artificial lighting is not used, as this could interfere with the driver or other occupants.) However, as will be evident from FIG. 1, in a rolling shutter sensor, ensuring that all rows are exposed with a common pulse would require the exposure period to be extended to at least the time from t0 to t1, likely longer than the time where subject motion (and even motion due to camera vibration) would cause image blur.

This has effectively excluded the use of cameras with rolling shutter sensors from such monitoring applications.

SUMMARY

According to the present invention, there is provided vehicle occupant monitoring system (OMS) including an image acquisition device with a rolling shutter image sensor according to claim 1.

In embodiments, the image sensor can be swapped between colour and monochrome operating modes in response to changing ambient light levels.

In embodiments, occupant monitoring can operate by acquiring an image from a region of interest (ROI) of the image sensor, with a sufficiently long exposure time to allow the scene to be illuminated with a pulsed IR light source, but short enough to avoid subject or acquisition device motion blur.

In embodiments, the exposure parameters for the image sensor when operating in ROI mode can be optimally controlled.

In embodiments, illumination of images can be improved within an image processing pipeline to take into account non-uniform illumination of the cabin by one or more infra-red light sources.

BRIEF DESCRIPTION OF THE DRAWINGS

Embodiments of the invention will now be described, by way of example, with reference to the accompanying drawings, in which.

DESCRIPTION OF THE EMBODIMENTS

Figure 2:
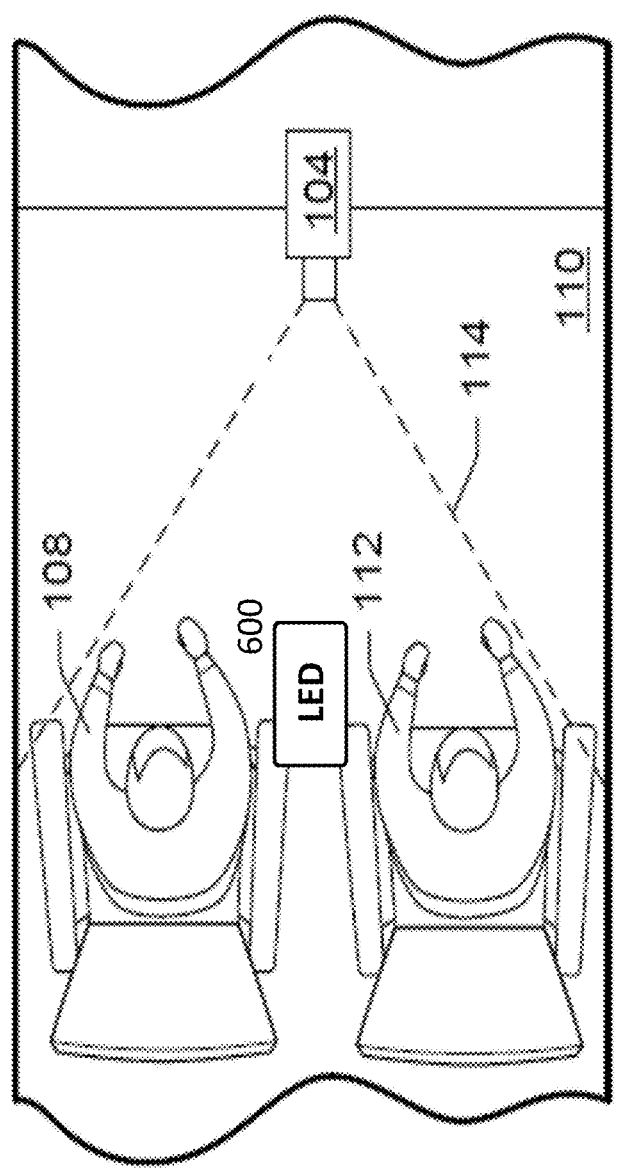
FIG. 2 illustrates an image acquisition device within a vehicle occupant monitoring system.

Referring now to FIG. 2, there is shown a vehicle cabin including an image acquisition device 104 for a vehicle occupant monitoring system according to an embodiment of the present invention.

In the embodiment, the image acquisition device 104 is mounted onto a solid/rigid surface, such as the vehicle A Pillar or, as in this case, the dashboard, to avoid rolling shutter effect artefacts caused by vehicle movement. In any case, the field of view 114 of the lens assembly for the device 104 is such that the face or indeed any body portion of interest of the vehicle occupants 108, 112 can be imaged at high enough a resolution that monitoring applications can use images acquired by the device 104 to perform their tasks appropriately.

As indicated, such applications typically need to continue to operate during low light or night time where the vehicle cabin is illuminated with one or more infra-red (IR) light sources, in this case one or more LEDs 600. Such light sources 600 can be positioned in a variety of locations around the cabin in a manner which ensures that even in low ambient light conditions, vehicle occupants can be imaged using an IR sensitive image sensor.

Ideally, such light sources 600 would operate in a pulsed mode to avoid heat build-up within the lighting fixture, but as explained above, this means that the image exposure time could be so long as to introduce motion blur in regions of interest within the image, for example, the face. Such blur, would mean that applications which rely, for example, on identifying eye gaze may not operate correctly.

Embodiments of the present invention employ an image acquisition device with a rolling shutter image sensor. The sensor is capable of operating in a Region of Interest (ROI) mode, where an ROI within the image sensor can be defined and image information can be obtained from only portions of selected rows corresponding to the ROI during subsequent image acquisition. An example of such a sensor is available from ON Semiconductor of Phoenix, Ariz. under the model number AR0820AT.

Figure 3:
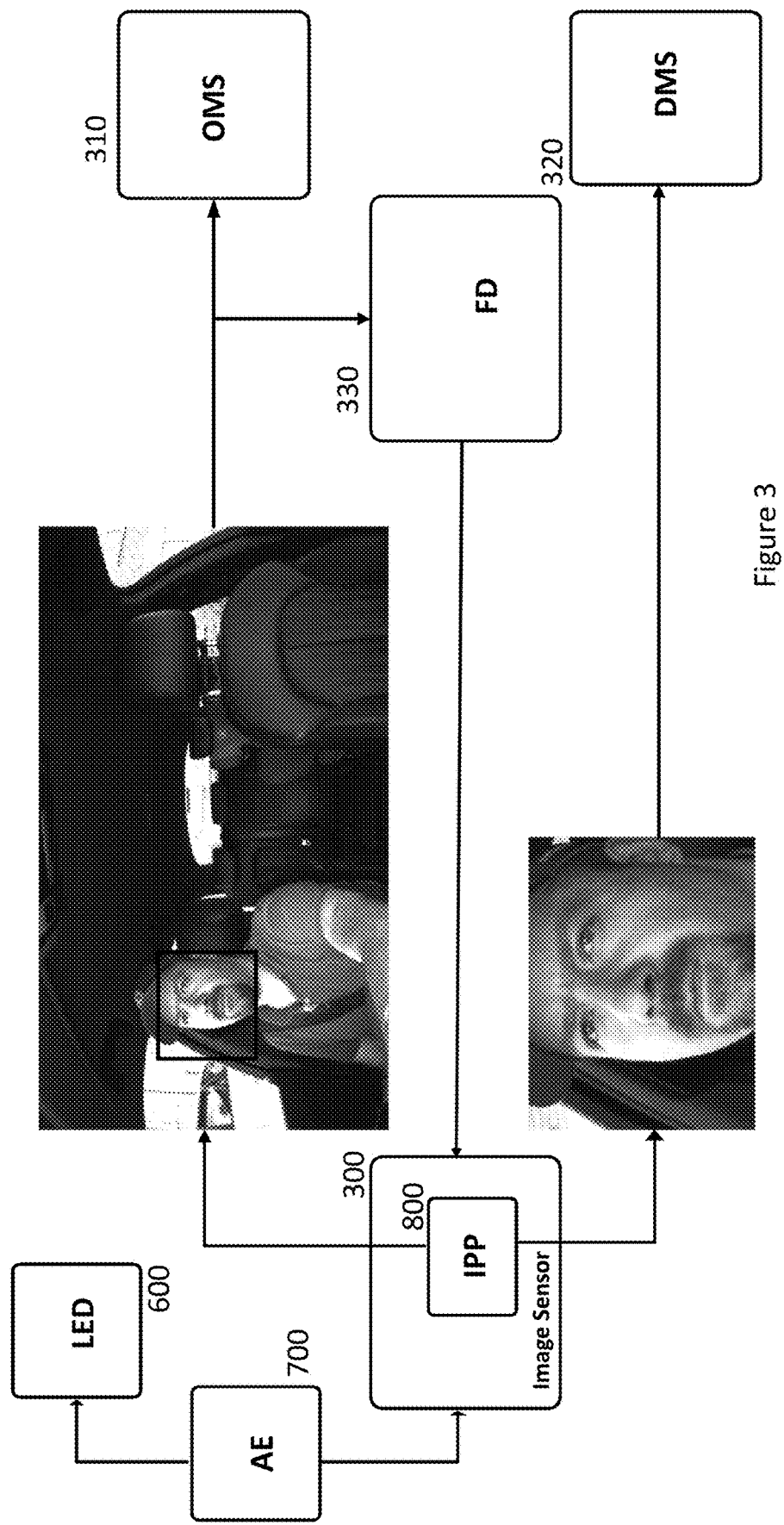
FIG. 3 illustrates a rolling shutter image sensor being swapped between full resolution and ROI exposure modes in accordance with an embodiment of the present invention.

Referring now to FIG. 3, the image acquisition device 104 including the sensor 300 operates in two modes. In a first full-resolution mode, image information from the entire sensor is obtained. The image may be a multi-plane colour image drawn from RGB sensitive sub-pixels of the image sensor 300, or alternatively, the image may comprise a monochrome image drawn from IR sensitive pixels of the sensor 300.

In some implementations, this involves using a sensor where sub-pixels are sensitive to R, G, B or IR light respectively and the sensor is swapped between acquiring images from the RGB sub-pixels in well-lit conditions to acquiring images from the IR sensitive pixels in low light conditions.

In some embodiments of the present invention, however, only one set of pixels is employed. The image sensor 300 is filtered that that each sub-pixel is sensitive to R+IR, G+IR or B+IR light respectively. In well-lit conditions, multi-plane image information is acquired separately from R+IR, G+IR and B+IR sub-pixels respectively. It is appreciated that by comparison to other visible light image sensors where RGB pixels are filtered to exclude IR light, this may result in some leakage and loss of image quality. However, full-resolution images acquired in this manner will have high enough quality for use by typical occupant monitoring system (OMS) 310 applications.

On the other hand, in low light conditions, the sensor 300 can be swapped so that it aggregates information from the R+IR, G+IR and B+IR sub-pixels to produce a high quality, high resolution monochrome image. It will be appreciated that this allows the sensor to operate at light levels multiple times lower than in RGB mode. If light levels drop still further, then the IR light source 600 can be actuated, although it will be appreciated that this may require a long exposure time so that the pulse illuminates each row of the image. Nonetheless, doing so then emphasises the IR components of the scene, which are especially useful for driver monitoring systems (DMS).

Note that in some implementations the image sensor 300 can comprise a Bayer array where the colour plane information for a given location in an image can be determined by interpolated values from sub-pixels surrounding the location. Thus, there may not be a one-to-one correspondence between sub-pixel and image locations—this is especially true when image resolution changes.

In the present patent specification, the term sub-pixel is used for an individual well within the image sensor which as described above can be sensitive to either R, G, B, IR or R+IR, G+IR, B+IR light. Indeed, in some image sensors, there can be sub-pixels which are broadly sensitive to visible or RGB+IR light.

Thus, when the light levels within the cabin are sufficient, an RGB image can be obtained without any artificial illumination of the cabin. On the other hand, if light levels are too low to obtain a useful RGB image, then an IR image can obtained. This image may require a long exposure time because of the low light levels, but also if a pulsed flash from the IR light source is required, it must illuminate all rows of the image sensor during their exposure time for a given frame and so again a long exposure time will be required. This may mean that such image frames are prone to a degree of blur, however, downstream applications which analyse the features of such images are typically not reliant on such images being completely sharp. One such example, is an OMS 310 which can be generally concerned with for example, identifying the general pose of occupants of the vehicle to determine if the occupants are seated correctly and safely. (Where the OMS is based on a neural network, then training data for the network can be augmented with motion blurred images.)

In any case, in embodiments of the invention, a full-resolution image obtained from the sensor 300 can also be analysed to determine a specific region of interest (ROI). In the example, the ROI is a face region surrounding the driver of the vehicle, so that the driver might be monitored by a DMS 320. As such, a face detector 330 is applied to the full-resolution image to identify a face region.

The image sensor 300 can now be controlled to operate in an ROI mode where image information from only a limited portion of a limited number of rows of the sensor is required. As will be seen from FIG. 3, even a relatively large face of a driver within the field of view of the camera extends across less than a third of the rows of the full-sensor. This means that the exposure time for a rolling shutter image does not have to be as long for all the rows of the image to be exposed under the illumination of a single pulse (or limited number of pulses) from one or more light sources. This allows a sharp, well-exposed image of the subject to be acquired for analysis by the DMS 320.

In some embodiments of the invention, an image for the ROI is captured for every full resolution image and an image bundle comprising the pair of full-resolution and ROI images is provided for analysis by downstream applications. However, it will be appreciated that this does not have to be the case and for example, if DMS is a priority, then a full resolution image would only need to be acquired whenever a new location for an ROI is required. For example, the DMS 320 failing to detect facial features within the image for the ROI may be attributed to the driver's face moving within the field of view of the camera and so a full resolution image may then need to be acquired and analysed by the face detector 330 to obtain a new location for the ROI bounding the driver's face.

As mentioned, the invention is not limited to the ROI comprising a facial region and in other implementations a ROI bounding a driver or occupants' body may be required, for example, for gesture detection and recognition.

As will be appreciated such a ROI may extend over a proportionally greater number of horizontal rows than a face region and so in such an application, the sensor 300 may need to be rotated through 90° so that the rows run upwardly. Again, this would allow an ROI image of a single occupant to be acquired using only a fraction of the rows required for a full resolution image and so allow a sharp image to be acquired with a short exposure time under illumination by a single (or limited number) pulse from a light source.

Figure 4:
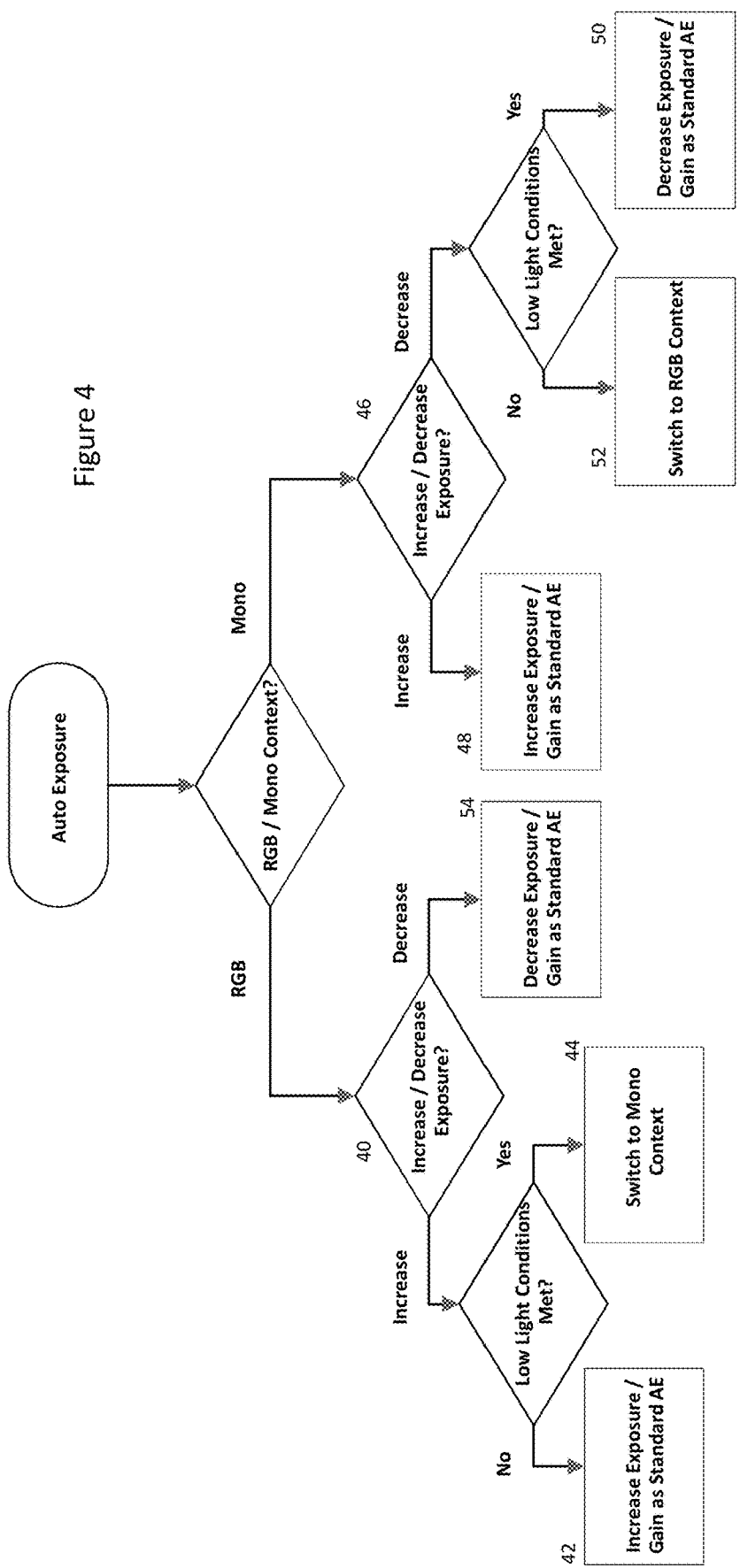
FIG. 4 illustrates an exposure control mechanism for determining if an image sensor should operate in RGB or monochrome image acquisition modes when acquiring a full-resolution image in accordance with an embodiment of the invention.

Referring now to FIG. 4, as indicated above, where a sensor comprises sub-pixels which are sensitive to R+IR, G+IR and B+IR light, it is possible for an exposure controller 700 to swap between operating the image sensor 300 in a multi-plane RGB mode or an aggregated monochromatic IR mode.

If the sensor is being operated in RGB mode, light levels within the cabin may drop to a point where an increase in exposure is required to provide a properly exposed image, step 40, e.g, an image where a minimum number of pixels are full exposed without being saturated (clipped), so providing maximum contrast within the image.

If this can be done by increasing the exposure time to below a threshold where subject movement would cause motion blur or increasing gain to below a maximum gain level, then the exposure controller 700 will determine that it is possible to remain in RGB mode with increased exposure levels, step 42.

On the other hand, if it is neither possible to increase gain further or permissible to increase exposure time further, the exposure controller 700 will determine that it is no longer possible to remain in RGB mode and will swap to mono mode, step 44.

When in mono mode, the exposure controller 700 may detect still decreasing light levels, step 46, and in this case can again either increase exposure time or gain, step 48.

On the other hand, if at step 46 increasing ambient light levels are detected, the exposure controller 700 will first determine if these have increased to the extent that a properly exposed image could be acquired in RGB mode. If not, the exposure controller 700 will simply decrease the exposure time or gain levels, step 50 in accordance with the priorities of the system. So, if the exposure time is relatively long, the exposure controller 700 may tend to reduce exposure time first to avoid blur and only subsequently reduce gain to limit noise.

In any case, if the ambient light level has increased sufficiently, the exposure controller 700 can swap back to RGB mode for acquiring the next full exposure image, step 52. This is likely to require a step change in increased exposure time and/or gain, because sub-pixel values are now divided into separate colour planes rather than aggregating their output. Nonetheless, if once in RGB mode, ambient light levels continue to increase, then exposure time and/or gain can then be decreased, step 54.

By being able to swap to operating in monochrome full resolution mode, exposure times can still be kept short enough that subject motion is not a critical issue in such images.

On the other hand, when operating in ROI mode, it is often desirable to obtain IR illuminated monochrome images as a matter of preference. Ideally these images would be acquired with exposure times as short as possible and gain as low as possible to reduce both motion blur and noise. It is nonetheless, desirable to be able to illuminate the subject with a single pulse (or low number of pulses) from the IR light source 600, for example, one or more LEDs disposed around the vehicle cabin, and so this source needs to be controlled to ensure properly illuminated images.

Figure 1:
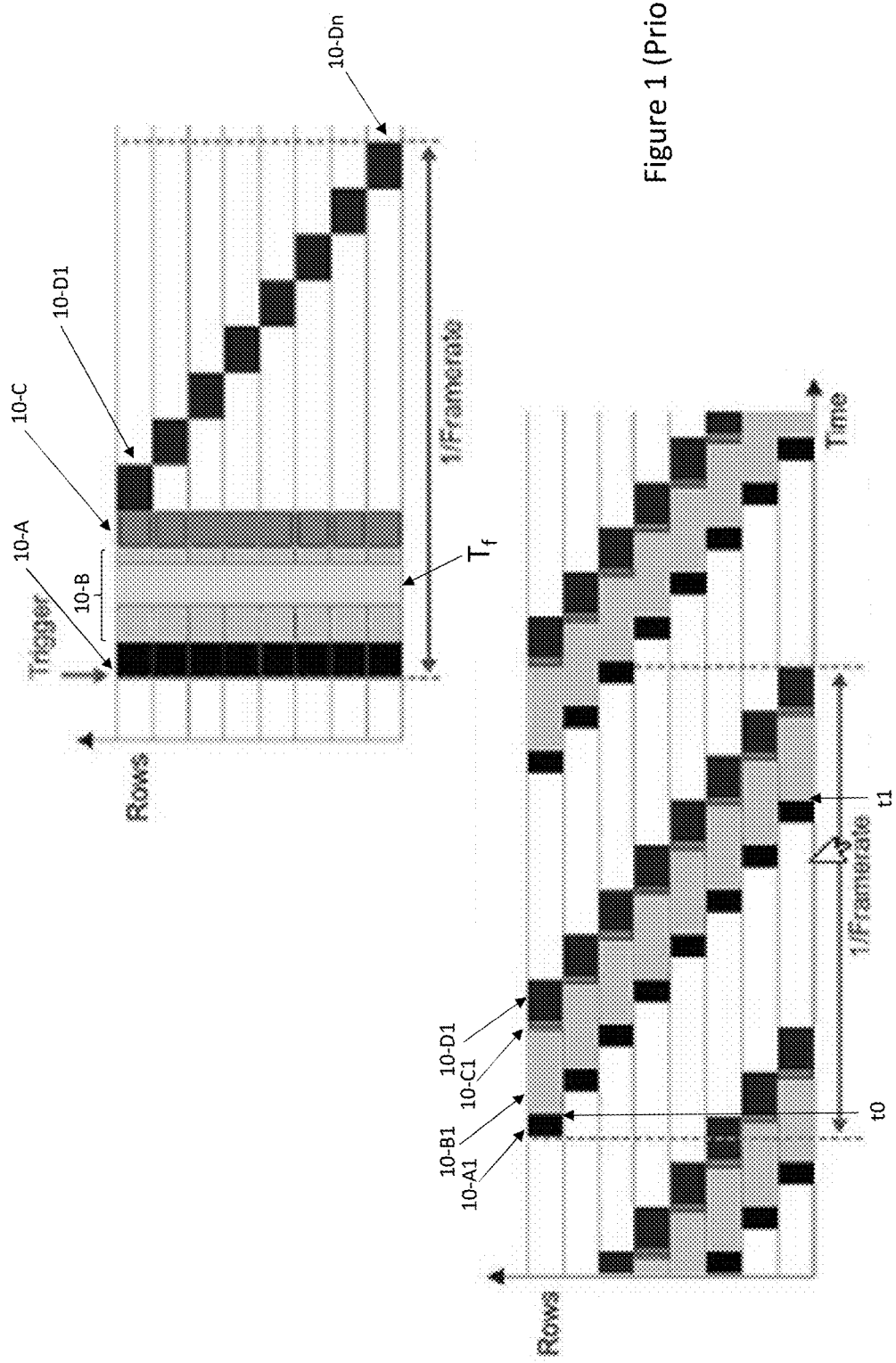
FIG. 1 illustrates the difference in operation between global shutter and rolling shutter image sensors.
Figure 5:
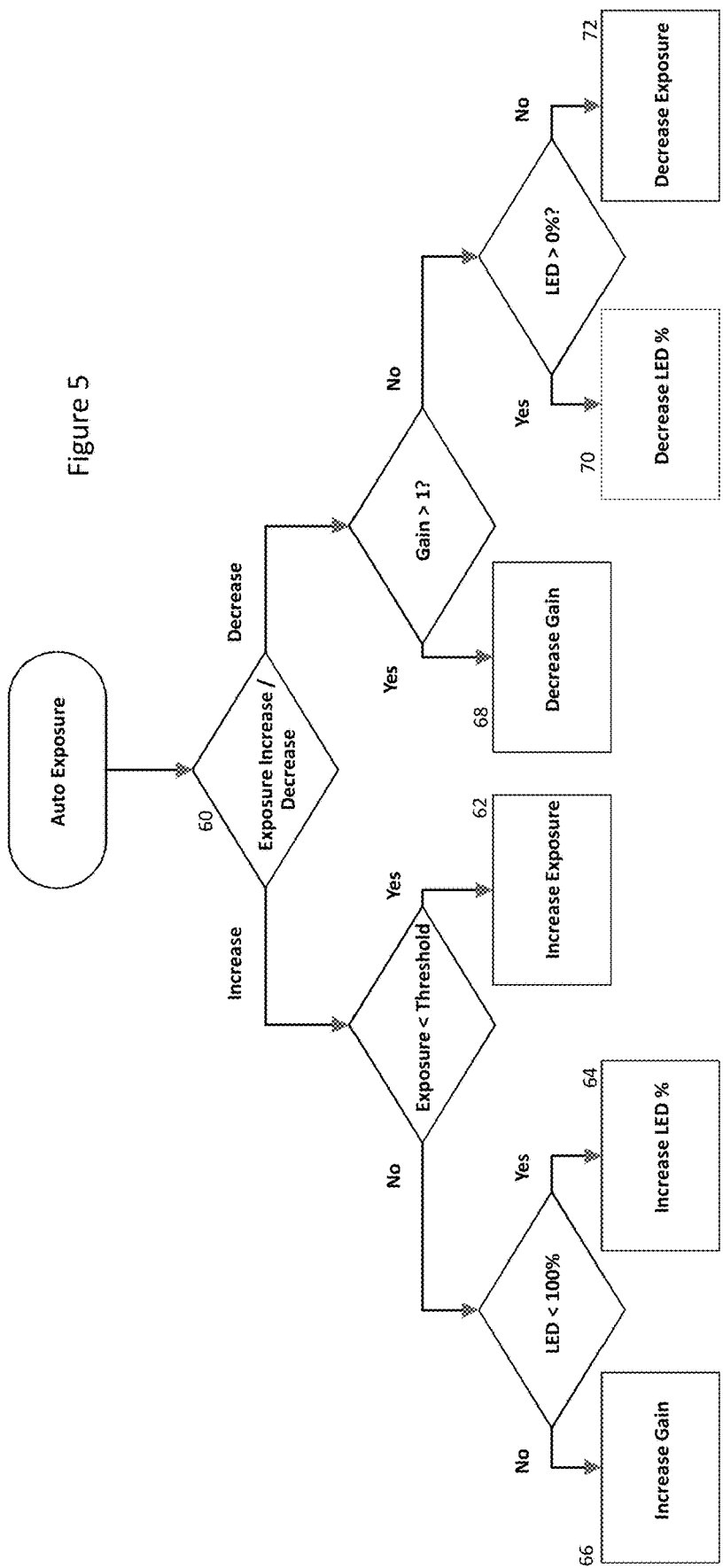
FIG. 5 illustrates an exposure control mechanism for determining exposure parameters when acquiring a region of interest (ROI) from an image sensor in accordance with an embodiment of the invention.

Referring now to FIG. 5 when operating in ROI monochrome mode, the exposure controller 700 needs to determine suitable exposure parameters for the ROI image. Note that this will be completely independent of the exposure time and gain determined for the full resolution image, especially as consideration needs to be given to the use of IR illumination of the image by the LED IR source 600. The process begins with the LED IR source 600 switched off. For acquiring any given image, the exposure controller 700 will determine whether the ambient light level requires an increase or decrease in exposure level, step 60. If ambient conditions have darkened from a previously acquire ROI image, then an increase in exposure level is required. The exposure controller 700 first decides whether it is possible to do this by increasing exposure time. As will be appreciated from FIG. 1, in a rolling shutter image sensor, if exposure time is less than a threshold time required to readout all rows of an image, then it is not possible to illuminate all rows of the image with a single pulse from the LED IR light source. It is assumed that when in ROI mode, the number of rows chosen will be low enough that this threshold level of exposure time required to allow all rows of the ROI to be exposed with a single pulse is still short enough that it does not cause issues with motion blur. As such, when exposure time does not exceed this threshold, the exposure level increased by increasing exposure time, step 62.

On the other hand, once exposure time has exceeded this threshold, it should not be increased further as this will start to introduce motion blur into acquired images. As such, the next option is to increase LED intensity, step 64. If LED intensity cannot be increased further, then sensor gain is increased, step 66. Clearly, once gain is increased to its maximum, no further increase of exposure level through this parameter will be possible. This situation should not occur, once IR light sources 600 are employed which are sufficiently powerful to illuminate any size of ROI image within the cabin in dark ambient conditions, but clearly there may be exceptional circumstances where for example, one or more of the IR light sources 600 is occluded.

Looking at the other side of FIG. 5, as ambient light conditions increase, the first objective is to reduce exposure level by reducing gain, step 68. Once gain has been reduced to below a threshold amount, in this case 1, the exposure controller 700 next looks to reduce LED IR light source intensity, step 70. It is only when the LED is no longer required that exposure time can be decreased, potentially until it is shorter than the threshold time required for using the IR light source 600, step 72.

Figure 6:
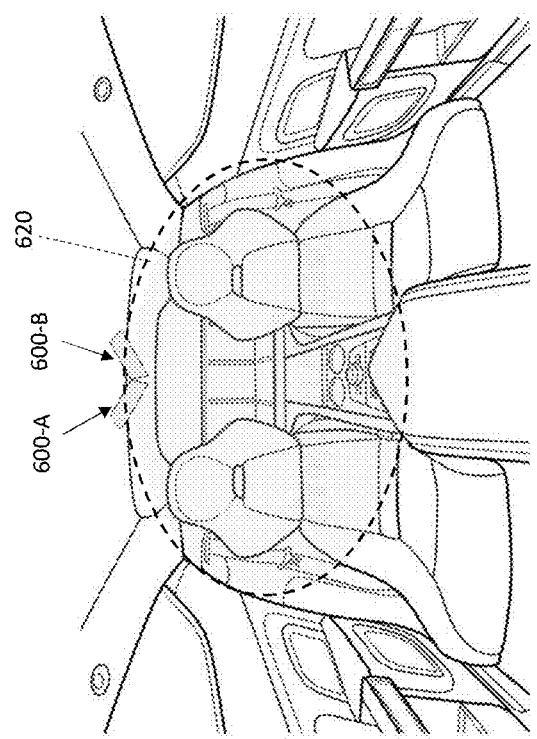
FIG. 6 illustrates correction for cabin illumination according to an embodiment of the invention.
Figure 6:
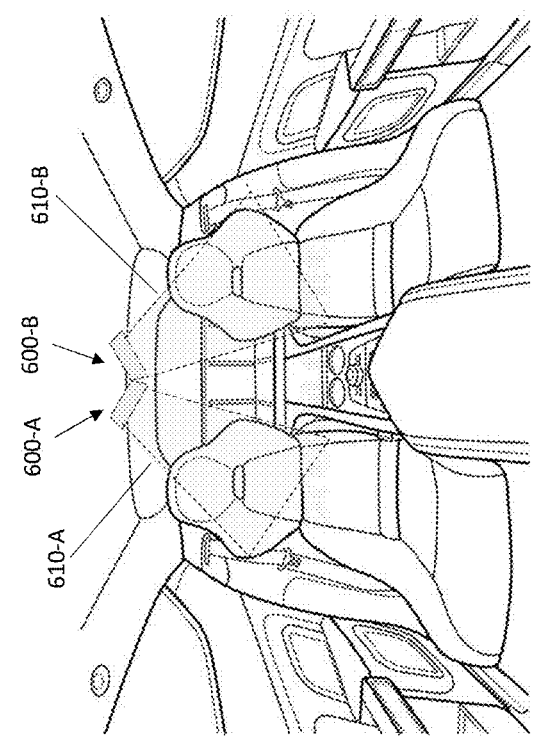

As mentioned above, one or more LED IR light sources 600 may be required to suitably illuminate the occupants of a vehicle, so that they can be monitored either generally by the OMS 310 or specifically, the driver, by the DMS 320. Indeed it can be a requirement not alone to monitor front seat occupants of a vehicle, but also rear passengers. Referring now to FIG. 6, in one example of the present application, a pair of LED IR light sources 600-A, 600-B are mounted on the roof of the cabin towards the centre of the cabin. The LEDs are directed outwardly so that they illuminate, as far as possible, both the front seat occupants and the rear passengers from the front and side. Nonetheless, it will be appreciated that this, and indeed various other lighting schemes, tend to illuminate the cabin unevenly, as illustrated by the two frusto-conical lighting zones 610-A, 610-B produced by the sources 600-A, 600-B.

While it would be desirable to produce a perfectly even illumination of all potential vehicle occupants under all circumstances, this may involve providing a larger number of IR light sources, so adding to system complexity and expense.

Some implementations of the present invention take advantage of the fact that when employed, the LED IR light sources 600-A, 600-B are generally the only source of IR light within the cabin and as the layout of the cabin, whether seats are occupied or not, is generally similar, an illumination map for the cabin can be generated. One way to generate such a map is simply to image the cabin in otherwise (IR) dark conditions, where the only sources of IR light within the cabin are the light sources 600-A, 600-B and to store this in a look-up table. As will be appreciated from FIG. 5, the light sources can be operated at a range of intensities and in this case, illumination maps could be obtained at a plurality of pre-set light source intensities. Then, if an intensity intermediate these intensities were being employed, interpolation could be performed to generate an appropriate illumination map. Alternatively, the map information could be transformed into a function which when executed can generate illumination information corresponding to the pattern of illumination of the light sources 600-A and 600-B at any given intensity.

In either case, this illumination map can be stored and then made available within the image processing pipeline (IPP) 800, FIG. 3, associated with the image sensor 104 for pre-processing images acquired by the image sensor 104. One task normally performed within the IPP 800 is lens shading correction, where the IPP 800 processes a raw image to compensate for the non-uniformity of transmissivity of light paths through the image acquisition device lens assembly, so improving the uniformity of illumination and colour within an acquired image.

Lens shading correction is based on having a lens shading function or map covering the field of view of the device 104, so allowing illumination values with the plane(s) of the acquired image to be corrected.

By combining the lens shading function/map with the illumination map for the cabin, when the LED IR light sources are actuated (and taking into account the selected intensity of the light sources, as discussed in relation to FIG. 5), the lens shading correction phase of the IPP 800 can produce a processed image appearing to be more even illuminated in the region 620 of the field of view of the device 104 normally including occupants of the vehicle.

The invention claimed is:

1. A vehicle occupant monitoring system, OMS, comprising:
    an image acquisition device with a rolling shutter image sensor comprising an array of sub-pixels which are respectively selectively sensitive to: red and infra-red; blue and infra-red; and green and infra-red light, said device being configured to selectively operate in either: a colour mode where a multi-plane image frame corresponding to the full image sensor is provided, each plane derived from red, green or blue sensitive sub-pixels respectively; or a monochrome mode, where sensor information from sub-pixels is aggregated to provide a single image plane; and
    a controller: responsive to detecting light conditions decreasing when operating in a first colour mode to swap to a first monochrome mode for a first subsequent image acquisition; responsive to the detecting light conditions increasing when operating in the first monochrome mode to swap to a second colour mode for a second subsequent image acquisition; responsive to the detecting light conditions decreasing when operating in the second colour mode to increase either exposure time or gain for a third subsequent image acquisition; and responsive to detecting light conditions increasing when operating in the first monochrome mode to decrease either exposure time or gain for a fourth subsequent image acquisition.

2. The vehicle OMS according to claim 1 further comprising:
    at least one infra-red, IR, light source disposed within a cabin of said vehicle and being configured to illuminate at least one occupant of the vehicle;
    said controller being configured to actuate said at least one infra-red, IR, light source when operating in said monochrome mode.

3. The vehicle OMS according to claim 1, wherein said device is configured to selectively operate in either: a full-resolution image mode where an image frame corresponding to the full image sensor is provided; or a region of interest, ROI, mode, where an image frame corresponding to a limited portion of a limited number of rows of the image sensor is provided; and
    further comprising:
    at least one infra-red, IR, light source disposed within a cabin of said vehicle and being configured to illuminate at least one occupant of the vehicle; and
    an object detector configured to receive a full-resolution image from said image sensor and to identify a ROI corresponding to an object of interest within said image;
    wherein said controller is configured to obtain an image corresponding to said ROI from said image sensor operating in ROI mode, said image having an exposure time long enough for all rows of said ROI to be illuminated by a common pulse of light from said at least one light source and short enough to limit motion blur within said image.

4. The vehicle OMS according to claim 3 wherein said object comprise a face of an occupant.

5. The vehicle OMS according to claim 4 wherein said occupant is a driver of said vehicle.

6. The vehicle OMS according to claim 3 wherein:
    said controller when operating in ROI mode is: responsive to detecting lighting conditions decreasing, for increasing the exposure time for a subsequently acquired image, unless said exposure time exceeds a threshold time for illuminating the rows of said ROI with a single pulse of IR light from said IR light source; responsive to said exposure time exceeding the threshold time, for increasing an intensity of said at least one IR light source, unless said increased intensity would exceed a maximum intensity; and responsive to said increased intensity exceeding a maximum intensity, for increasing a gain for pixels of said image sensor.

7. The vehicle OMS according to claim 3 wherein:
    said image acquisition device comprises a lens assembly having a varying transmissivity across a field of view of the image sensor; and said at least one infra-red, IR, light source is configured to illuminate at least one occupant of the vehicle with varying illumination across the field of view of the image sensor;

said OMS further comprising:

an image processing pipeline configured to obtain and pre-process an image acquired from said image sensor in accordance with a lens shading map and a cabin illumination map in order to compensate for both said varying transmissivity and said varying illumination in order to provide a more uniformly illuminated image to a controller for further analysis.

8. The vehicle OMS according to claim 6 wherein said controller is: responsive to detecting lighting conditions increasing, for decreasing the gain for a subsequently acquired image, unless said decreased gain would be less than a threshold gain; responsive to said decreased being less than said threshold gain, decreasing said IR light source intensity, unless said decreased intensity would be less than 0% intensity; and responsive to said decreased intensity being less than 0% intensity, for decreasing an exposure time for said subsequently acquired image.

9. The vehicle OMS according to claim 7 wherein one or both of said lens shading map and said cabin illumination map is obtained either: by executing a function; or by reading pre-calibrated information from a look-up table.

10. The vehicle OMS according to claim 7 wherein said illumination map is a function of light source intensity being employed to illuminate said image.

11. The vehicle OMS according to claim 7 wherein at least two of said IR light sources are disposed on a roof of said cabin towards the centre of said cabin and directed outwardly and downwardly towards respective sides of said cabin.

12. The vehicle OMS according to claim 7 wherein said image acquisition device is mounted on one of an A pillar or a dashboard of said vehicle.

* * * * *